UNITED STATES PATENT OFFICE.

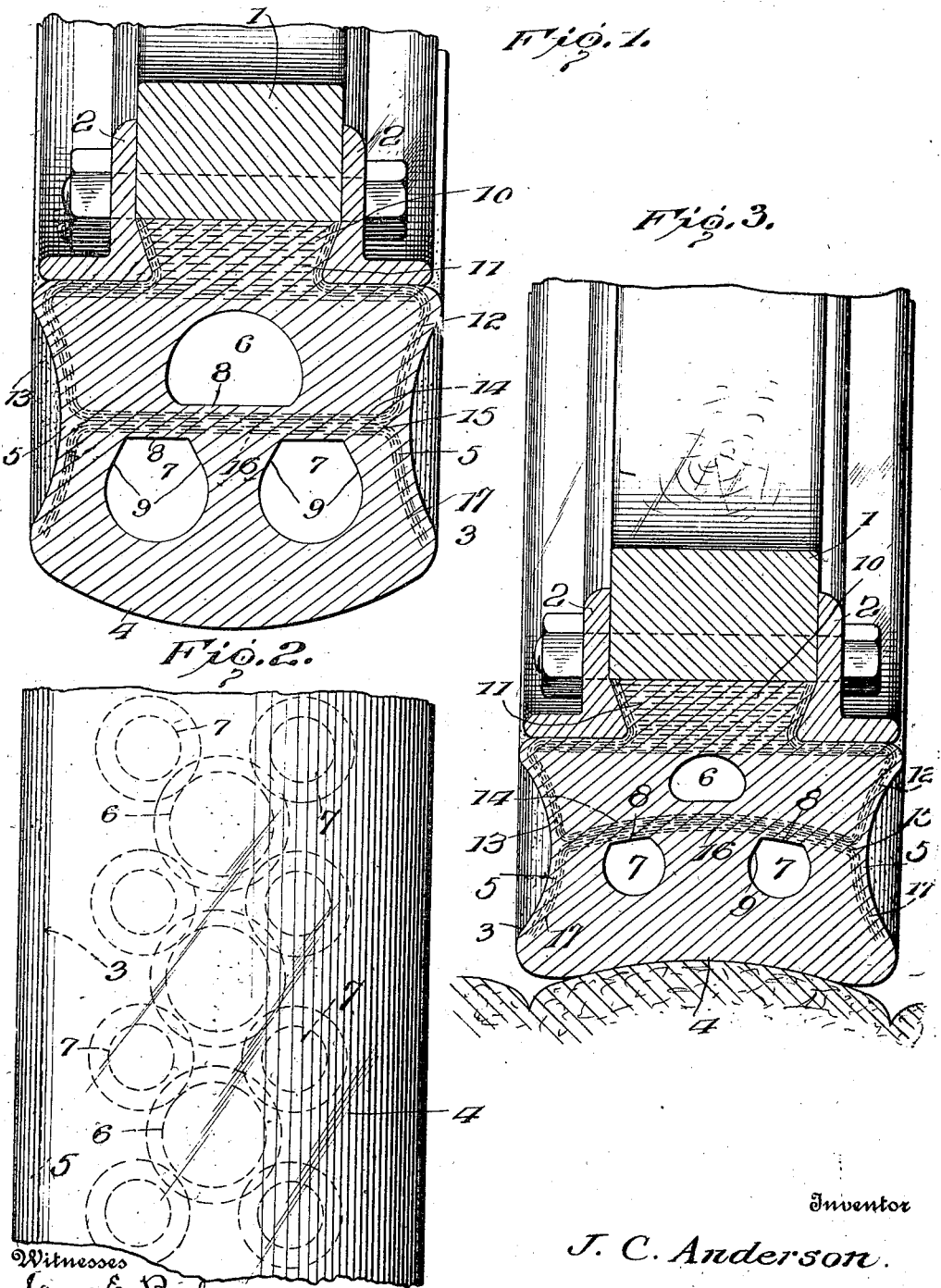

JAMES C. ANDERSON, OF WASHINGTON, DISTRICT OF COLUMBIA.

AUTOMOBILE-TIRE.

1,188,233.  Specification of Letters Patent.  Patented June 20, 1916.

Application filed January 23, 1915. Serial No. 3,983.

*To all whom it may concern:*

Be it known that I, JAMES C. ANDERSON, citizen of the United States, residing at Washington, in the District of Columbia, have invented certain new and useful Improvements in Automobile-Tires; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

The invention relates to an improvement in automobile tires constructed primarily of the cushion type, being particularly designed with a view to utilizing pneumatic resistance to the load strain.

The salient feature of the present invention utilizes a principle of rubber, namely that rubber, while capable of distortion or form change under pressure is not capable of compression as a mass, or in other words that pressure applied to a formed body of rubber will distort that body without materially condensing same.

The present invention is designed to utilize this fact in forming the tire structure with a series of cells, particularly disposed with relation to each other, and containing air under normal atmospheric pressure, the tire structure *per se* being such as to direct the distortion of the tire body under load strain to a reduction in size of the said cells, whereby the air within the openings is put under pressure to form a pneumatic resistance to the load strain sufficient to constitute an inflated tire.

The present invention is specifically directed to utilizing a rubber section having a peculiar tire outline formation and formed with a series of cells disposed therein in particular relative positions, there being combined with the rubber structure a means whereby the distortion of the rubber is prevented from outward lateral action and compelled to an inward action with the result to reduce the size of the cells and therefore decrease the volume of contained air with the resultant pneumatic pressure as a resistance of the load strain.

The invention while designed and intended as of general application to various types of cushion tires, will be described in the following specification with particular reference to a specific example, which is illustrated in the accompanying drawings, wherein:—

Figure 1 is a cross section of my improved tire. Fig. 2 is a detail plan view of the same. Fig. 3 is a view similar to Fig. 1, but illustrating the tire distorted when under load strain.

In the specific illustration 1 represents an ordinary wheel rim or felly, and 2 a securing means whereby the tire may be secured to the rim. However, I preferably employ two clamps having outwardly projecting flanges, which coöperate with the base of the tire, as will presently appear.

The improved tire, designated generally by 3, is a rubber section, the outer or tread surface 4 of which is rounded as usual, the side walls 5 of the tire body are concaved to an appreciable extent, and this concavity is of a material importance in the composite function of the structure under load strain, as will later appear. The concavity or concaved formation of the side walls need not be to a considerable extent, it being sufficient that the minimum transverse dimension of the tire be somewhat less than the maximum dimension at the tread surface.

The tire body is formed with a series of cells an inner series 6 arranged in the form shown, in the central line of the tire longitudinally and inwardly, that is, toward the felly of the transverse median line of the tire. The cells 6 are arranged in a plane concentric to the tread surface of the tire and may be spaced apart any desired distance. The outer half of the tire body, that is, beyond the transverse median line with relation to the rim is formed with a series of cells 7 arranged preferably in opposing pairs, transversely and presenting two parallel lines of cells concentric with the tread surface. The cells 7 are, however, arranged beyond the plane of the cells 6 with respect to the vertical dimension of the tire, that is said cells 7 are arranged adjacent the side walls 5 of the tire body while the cells 6 are arranged centrally between said walls. The adjacent edges of the respective cells 6 and 7, that is the edges of said cells next to the median lines of the tire are directly transverse the tire, or in parallelism with the median line as at 8, presenting straight edges, the remaining wall portion of the cells 6 being rounded from such straight edge as shown, while the cells 7, in the remaining wall portion beyond the edge 8 presents squared or flat portions 9 from which the wall is rounded so as to present the maximum dimension of the cells toward the tread surface of the tire.

The tire body is provided with the usual projecting or rim engaging portion 10 designed in this instance to be secured between the clamping members or rings in connecting the tire to the felly. The projecting or clamp engaging portion of the tire is particularly constructed with a view to prevent its compression or distortion under load strain, and for this purpose I prefer that such portion be constructed of layers 11 of various fabrics and interposed rubber, which may be best suited to attain the desired result. The layers, while preferably fabric, may be of any desired material. The body portion of the tire projects laterally beyond the base portion to provide abutting surfaces for the flanges on the rings, so that under load strain the base 10, and the flanges form a continuous base extending entirely across the active face of the tire, so as to cause the rubber to distort laterally.

A fabric strip or strips 12, hereinafter termed the restraining strip forms the side walls or edges of the clamp engaging portion 10, from which the restraining strip 12 is projected into the body of the tire, extending within said body in spaced approximately parallel relation with the inner edge 13 of the tire body beyond the projecting portion 12 and thence outward into approximately parallel relation with the side walls 5 to the transverse median line of the tire, at which point the restraining strip extends transverse the tire as at 14, a second restraining strip 15 being arranged in the outer portion of the tire body having a transverse web 16 extending adjacent and in parallelism with the transverse median line of the tire with the end portion extending outwardly in approximate parallelism with the side walls 5 as at 17, the ends of this strip terminating short of the tread surface of the tire. There is thus provided two restraining strips having transverse web portions extending approximately throughout the transverse dimension of the tire presenting webs in parallelism disposed between the respective sets of cells 6 and 7, the restraining strips extending in opposite direction from the transverse web portions, embedded in the tire, so that the greater portion of the tire body is held within the restraining strip portions 12 and 17, against outward expansion of the body portion, as will be plainly apparent from the drawings.

In use the tread surface of the tire, under load strain is subjected to a compressible action, and as rubber, as previously stated, has been demonstrated in practice, is non-compressible, it is obvious that the load strain on the body tends to a distortion, that is the material apparently displaced by the load strain is evidenced by an extension at some other portion of the tire body. As the restraining strips 12 and 15 are non-extensible being particularly of a nature to embody this characteristic, and as the side walls 5 are concave or slightly inwardly curved, it is apparent that this distortion must, for practically its entire degree be held within the body of the tire, if the construction is such as to permit such distortion. It is for this purpose that the cells 6 and 7 are provided, as under the distortion incident to the load strain and prevented from external spreading by the shape of the tire walls and the restraining strips will of necessity be wholly within the interior of the body, that is the distortion will tend to practically confine itself almost entirely to the inward extension of the walls of the cells. This is due to the fact that the cells are arranged close together, and their axes are substantially radial, thus load pressure occurs only in line with several of the cells and tends to distort the intervening walls and reduces the size of these cells, and under such reduction in size there is obviously a compression of the contained air to a high degree, thereby securing the pneumatic resistance to the load strain, and the air cushion effect against momentum shocks, the latter result following because of the individuality of the cells.

By disposing the outermost cells 7 in parallel rows out of radial line with the innermost cells 6 the tire body presents a solid line of material between the edge walls 8 of the cells 6 and the radially alined portion of the tread surface. The direct distortion incident to the compressive action on the tread surface in this portion of the tire body is thus communicated directly to the cells 6, whereby they materially reinforce the pneumatic resistance of the outer cells 7. The latter by the disposition of the side edges of the tire body take care of the lateral tendency to distort under the load strain, so that the side walls of these cells as well as the outer walls tend to an inward spreading for air compressive purposes. It will therefore be appreciated that by the peculiar form of the tire together with the restraining webs and the specifically located cells I have provided a tire body in which the distortion, under load strain, tends to a compression of the air within said cells to provide in effect a pneumatic resistance, hence serving under all circumstances the full resiliency incident to the usual pneumatic tire with obviously none of the disadvantageous characteristics of such tire. The specific example illustrated and described is a simple type of a tire body in which provision is made for utilizing the peculiar conditions hereinabove described, it being obvious that many other types of body may be as readily constructed wherein the same principle is utilized to the same end, the illustration forming part of this application is intended merely as illustrative of a general principle of use, all other forms which may fall within the scope of the appended claims being contemplated within the spirit of the invention and this application.

It is to be noted that the cells are so shaped and disposed with reference to each other, that a substantial wall exists between them, hence when the tire contacts with the road surface, but several of the openings, in a limited area act as a cushion. This results in only the walls between the cells being distorted to reduce the area of the cells and compressing the air therein. Thus the area of the cells outside those active to cushion the tire, is maintained, consequently the partitions of rubber therebetween remain the same, and all load strain is absorbed only by the intervening cells.

What is claimed is:—

1. A tire body formed with a plurality of spaced closed cells, each of which contains atmospheric air, the tire body being constructed to cause the sides thereof to be distorted inwardly toward each other when load pressure is applied to progressively reduce the area of the cells and compress the air therein when the tire is subjected to load strain.

2. A tire body formed with an inner and an outer series of cells and independent means in the tire body and about the respective sets of cells to compel the body distortion under load strain to be directed inwardly toward said cells to progressively compress the air in said distorted cells.

3. A tire body having an inner series of cells arranged on the radial center of the body and inwardly of the transverse median line and two outer series of cells arranged beyond the transverse median line and out of radial alinement with the inner series of cells all said openings containing atmospheric air, and a restraining web arranged partly about each set of cells, whereby to inwardly distort the walls of the cells when the tire is under load strain to reduce the size of said cells to compress the air.

4. A tire body having an inner series of cells arranged on the radial center of the body and inwardly of the transverse median line and two outer series of cells arranged beyond the transverse median line and out of radial alinement with the inner series of cells, all said openings containing atmospheric air, and a restraining web arranged partly about each set of cells, the outer walls of the tire being concaved, whereby to inwardly distort the walls of the cells when the tire is under load strain to reduce the size of said cells to compress the air therein.

5. A tire body having an inner series of cells arranged on the radial center of the body and inwardly of the transverse median line and two outer series of cells arranged beyond the transverse median line and out of radial alinement with the inner series of cells, and a restraining web arranged partly about each set of cells, the outer walls of the tire being concaved, the restraining webs being embedded in the tire body adjacent the surface thereof.

6. A tire body having an inner series of cells arranged on the radial center of the body and inwardly of the transverse median line and two outer series of cells arranged beyond the transverse median line and out of radial alinement with the inner series of cells, and a restraining web arranged partly about each set of cells, said tire body including an inner layer of non-compressible material to form a base to resist the compression when the tire is under load strain.

7. A tire body having an inner series of cells arranged on the radial center of the body and inwardly of the transverse median line and two outer series of cells arranged beyond the transverse median line and out of radial alinement with the inner series of cells, said tire body including an inner layer formed of fabric layers to provide a base to resist compression when the tire is under load strain.

8. A resilient tire body having a series of spaced closed cells containing atmospheric air, the opposite sides of the tire body being slightly concave, whereby when load pressure is applied to the tire the walls of the cells become distorted and the air in said cells is compressed.

9. A resilient tire body having a series of cells containing atmospheric air, means including a non-stretchable member extending transversely of the tire body to cause the tire body to distort inwardly and upwardly toward the center of said body, whereby the walls of the cells will be distorted and the air in said cells is compressed when load pressure is applied to the tire.

10. A resilient tire body having a series of cells adjacent the inner wall thereof and containing atmospheric air, the outer walls of said tire body being concave, and a non-stretchable member adjacent the said cells, whereby the walls of the cells will be distorted and the air in said cells compressed.

11. A resilient tire body having its outer side walls concaved, a non-stretchable member at the inner portion of the tire body, said tire body having cells containing atmospheric air, the concave sides and the non-stretchable member causing the tire body to be distorted from the outer side edges of the tread surface to a median line at the non-stretchable member when load strain is applied, whereby to distort the walls of the cells to compress the air therein.

In testimony whereof I have signed my name to this specification in the presence of two subscribing witnesses.

JAMES C. ANDERSON.

Witnesses:
EMILY F. CAMP,
JNO. IMIRIE.